United States Patent [19]
Blaese

[11] Patent Number: 5,357,262
[45] Date of Patent: Oct. 18, 1994

[54] AUXILIARY ANTENNA CONNECTOR

[76] Inventor: Herbert R. Blaese, 3314 Olcott Ave., Chicago, Ill. 60634

[21] Appl. No.: 108,175

[22] Filed: Aug. 17, 1993

Related U.S. Application Data

[63] Continuation of Ser. No. 805,463, Dec. 10, 1991, abandoned.

[51] Int. Cl.$^5$ .......................... H01Q 1/50; H01Q 1/00
[52] U.S. Cl. ............................. 343/906; 343/702; 439/581
[58] Field of Search .......... 343/702, 711–713, 343/906, 860, 862, 864; 333/24 R, 24 C; 439/578, 581, 928; H01Q 1/00, 1/24, 1/25, 1/26, 1/27, 1/50

[56] References Cited

U.S. PATENT DOCUMENTS

| | | | |
|---|---|---|---|
| 2,237,260 | 4/1941 | McDonald, Jr. | 343/702 |
| 3,946,390 | 3/1976 | Alexander et al. | 343/702 |
| 4,031,468 | 6/1977 | Ziebell et al. | 343/702 |
| 4,193,076 | 3/1980 | Ito et al. | 343/702 |
| 4,523,197 | 6/1985 | Imazeki et al. | 343/702 |
| 4,613,833 | 9/1986 | Harada | 333/24 R |
| 4,875,051 | 10/1989 | Blaese | 343/864 |
| 5,057,847 | 10/1991 | Väisänen | 333/24 C |

FOREIGN PATENT DOCUMENTS 0055704  4/1985  Japan ....................... 343/702

Primary Examiner—Rolf Hille
Assistant Examiner—Peter Toby Brown
Attorney, Agent, or Firm—Gerstman, Ellis & McMillin, Ltd.

[57] ABSTRACT

An antenna connector communicates with antenna input/output circuitry of a transmitter/receiver such as a portable telephone. A length of conductive cable is provided with a connector for physical connection to the transmitter/receiver. The same connector is adapted for spaced, electronic connection with the input/output circuitry using at least one of induction and capacitance without a connecting conductor. The other end of the cable is adapted for conductive connection with an antenna. Thus, a non-invasive, removable connection is provided between an antenna and a portable telephone or the like to upgrade the performance of the telephone when needed, for example in an automobile.

12 Claims, 1 Drawing Sheet

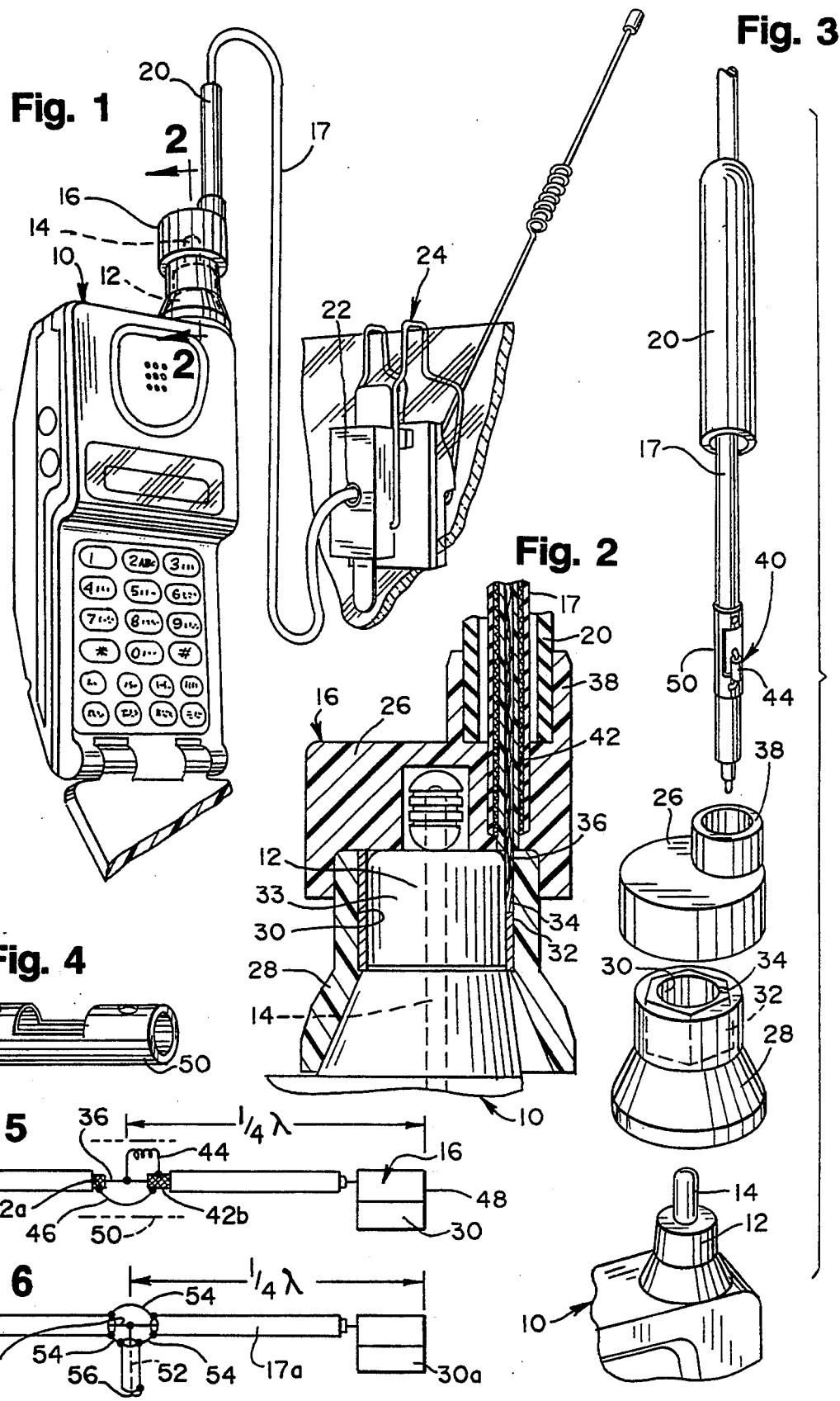

AUXILIARY ANTENNA CONNECTOR

This application is a continuation of U.S. application Ser. No. 805,463, filed Dec. 10, 1991, and now abandoned in the name of Herbert R. Blaese, for "AUXILIARY ANTENNA".

BACKGROUND OF THE INVENTION

Portable telephones which may be carried by hand are rapidly growing in commercial acceptability. The user of a hand-carried portable telephone can make calls on the way from the office to his car, or on a commuter train, or anywhere else. However, as a disadvantage, in an automobile, for example, the transmission and receiving effectiveness of such a portable telephone may be limited by the steel structure of the car in which the user sits.

For this reason, car telephones usually have an outside antenna, often an outside antenna in which an antenna portion inside the car directly communicates with the car telephone, but also communicates in an inductive or capacitive manner through an automobile window to an outer antenna attached to the window, without any physical contact being made between the two antenna parts through the window. Such antennas are sold by Mobile Mark, Inc., of Schiller Park, Ill.

Since a hand-held telephone carries its own antenna, and thus is not in connection with an outer antenna carried on a car or the like, the reception of a hand-held telephone can be poor when the user is attempting to make a telephone call inside of an automobile, or anywhere else where steel structural members or the like are present to interfere with signal transmission.

To make a portable telephone more versatile and useable, it may be provided with a removable antenna so that the socket of the portable telephone that carries the antenna may be connected to another, more suitable antenna. However, that is somewhat cumbersome, having the risk that the removed antenna can be lost. Also, many portable telephones carry permanent antennas, so that the above expedient is not readily available in their case.

In accordance with this invention an antenna connector is provided for communication with a portable telephone, or any other transmitter/receiver, which does not require the removal of an antenna to make connection. Thus, the portable telephone or other transmitter/receiver may be temporarily connected to an auxiliary antenna through the antenna connector of this invention. A portable telephone, for example, may be connected to an exterior automobile antenna while the user is sitting in the automobile. Then, the antenna connector and the portable telephone may be easily disconnected, and the portable telephone carried away by the user. Similarly, any other type of transmitter/receiver may thus be temporarily connected to any antenna system, to enhance the signal transmission and reception, and the overall utility of the system.

DESCRIPTION OF THE INVENTION

In accordance with this invention, an antenna connector is provided for communication with antenna input/output circuitry of a transmitter/receiver, which typically has an outer casing. The input/output circuitry may be entirely conventional, and the transmitter/receiver may be a portable telephone, a two-way radio, or simple radios or TVs which only receive signals and do not necessarily transmit them, by way of example.

The antenna connector of this invention comprises a length of conductive cable, typically coaxial cable. Means are attached to one end of the cable for removable, physical connection to the transmitter/receiver. Means are also provided for spaced, electronic connection with the input/output circuitry of the transmitter/receiver. The respective two means described above may comprise common structure which performs the functions of both means, if desired.

The means for spaced, electronic connection uses at least one of the principles of induction and capacitance, and is free of a connecting conductor for directly transmitting signals between the input/output circuitry and the means for spaced, electronic connection. In fact, typically, the electronic connection takes place with the input/output circuitry on the inside of the outer casing of the transmitter/receiver, and the electronic connection means being carried on the outside of the casing, without any physical connection of a conductor extending through the casing. Instead, signals pass through the casing by preferably capacitance, or induction, or a combination of the two.

The cable also defines an end opposed to the one cable end described above, having means for conductive connection with an antenna. This conductive connection means may be a permanent connection with an antenna system, or it may be a jack for temporary, removable connection with an antenna system, if desired.

The antenna connector of this invention also has means for providing impedance matching between the cable and the transmitter/receiver. For example, a typical cable used in this invention may have an impedance of 50 ohms. The transmitter/receiver to which it may be attached typically has a higher impedance. Thus, when the cable is coaxial cable having an inner conductor and a spaced, outer conductive sleeve, inductive shunt means may communicate with the inner conductor at essentially quarter wave spacing relative to the means for electronic connection. The shunt means also communicates with the outer, conductive sleeve, to provide impedance matching between the cable and the specified transmitter/receiver.

It is also preferred for the means for electronic connection to comprise a conductive sleeve forming part of the physical connection means, which conductive sleeve also serves as a capacitive plate. The conductive sleeve is connected with the cable inner conductor, so that signals may be capacitively propagated between the input/output circuitry and cable.

The conductive sleeve preferably defines a frustoconical bore proportioned to grip an antenna housing of a transmitter/receiver for removable retention thereon. Also, the conductive sleeve may define an outer surface of polygonal cross section, with the conductive sleeve residing in an aperture of similar polygonal cross section in a connector housing carried by the cable, to prevent relative rotation of the conductive sleeve and the connector housing.

The antenna connector of this invention may be connected to a transmitter/receiver in both physical and electronic connection at a position which surrounds the permanent antenna. This is particularly useful for portable telephones and the like which have a retractable, permanent antenna, with the hub that carries and guides the permanent antenna also providing means for frictional attachment of the antenna connector, typically with the conductive sleeve being frictionally lodged on the antenna hub. Signals then pass between the portable telephone and the cable, substantially apart from the permanent antenna, especially when the hub is made of an electrically nonconductive material. Additionally, the antenna connector of this invention may be attached to a different portion of the outer casing, which would then be made of an electrically nonconductive material so that signals may pass therethrough.

DESCRIPTION OF THE DRAWINGS

In the drawings,

FIG. 1 is a perspective view, with portions broken away, of a portable telephone reversibly connected with the antenna connector of this invention, which, in turn, is connected with an outside, window-mounted antenna such as may be conventionally found on an automobile;

FIG. 2 is an enlarged sectional view taken along line 2—2 of FIG. 1;

FIG. 3 is an exploded perspective view of a portion of the structure of FIG. 1;

FIG. 4 is a perspective view of a housing part for the means for providing impedance matching between the cable and the portable telephone;

FIG. 5 is a detailed, partially diagrammatic view of the one embodiment of the impedance matching means; and FIG. 6 is a similar view of another embodiment of the impedance matching means.

DESCRIPTION OF SPECIFIC EMBODIMENTS

Referring to the drawings, FIG. 1 shows a conventional portable telephone 10, such as a Motorola flip phone, with the speaker portion being broken away, having an antenna guide housing 12, which retains a permanent, retractable antenna 14 shown in the retracted mode.

Antenna connector 16 of this invention is shown being carried on antenna guide housing 12. Antenna connector 16, in turn, is connected to a length of coaxial cable 17, with the connection being supported by a tubular strain relief 20. At the end 22 of cable 17 which is opposite to the cable end communicating with antenna connector 16, there is a permanent connection with a conventional, window-mounted antenna system 24. Alternatively, if desired, end 22 of cable 17 may communicate with a jack or connector that, in turn, releasably connects with any desired antenna system. Thus, by this invention, telephone 10 may be releasably connected to antenna connector 16, for improved range and clarity of the signal of the telephone conversation while the user is seated for example in an automobile. Then, the user may disconnect telephone 10 and take it with him as he leaves the automobile.

As an alternative, the same antenna system 24 may have another permanent connection with another telephone system in the automobile, with cable 17 being a second, auxiliary connection to the same antenna.

Turning to FIGS. 2 and 3, the various parts of antenna connector 16 and cable 17 are shown.

Antenna connector 16 comprises, in this embodiment, a pair of mating, plastic housing parts 26, 28 which frictionally fit together and may be sealed in place as shown in FIG. 2. Housing part 28 defines a bore in which is frictionally carried a conductive metal sleeve 30, which defines a bore 33 of slight frustoconical shape to provide for effective, frictional engagement with antenna guide housing 12 as shown in FIG. 2. Conductive metal sleeve 30 can be made thin enough to flex in a slight manner to further facilitate the removable, frictional retention of antenna connector 16 on antenna guide housing 12.

Also, sleeve 30 defines an outer surface 32 which may be of polygonal cross section, or specifically hexagonal, with conductive sleeve 30 residing in an aperture of connector part 28 which is of similar hexagonal cross section, for a snug, non-rotating, retentive fit between the two parts 28, 30. Conductive sleeve 30 also defines a slot 34 into which the central conductor 36 of coaxial cable 17 may be inserted and sealed by soldering. Thus, conductive sleeve 30 may receive signals from central conductor 36, and may serve as a capacitive plate for transmitting signals through the nonconductive plastic of the telephone housing, particularly antenna guide housing 12, for capacitive electronic communication with input/output circuitry of telephone 10. Specifically, the input/output circuitry of telephone 10 may conventionally comprise LC networks and a duplexer, with the electronic capacitive coupling being typically at the duplexer output.

It can be seen that cable 17 and strain relief 20 project through a tubular projection 38 carried on connector part 26, to enter into electrical connection with sleeve 30. Thus, it can be seen that sleeve 30 provides both physical connection by its physical, frictional retention to antenna guide housing 12, and also electronic connection through its function as a capacitive plate, with portable telephone 10.

Means 40 are provided for impedance matching between cable 17 and telephone 10. Typically, cable 17 will have an impedance of about 50 ohms, while a typical telephone 10 will have a higher impedance. As shown in FIGS. 2-5, cable 17 defines a portion in which the outer insulation has been removed to expose and sever outer, braided, tubular conductor portion 42, providing a gap between the various segments of braided conductor 42a, 42b. Central conductor 36 crosses the gap between braided conductors 42a, 42b in continuous manner.

As is conventional for impedance matching, an inductive shunt 44 extends between central conductor 36 and outer conductive braid portion 42b as shown, while another conductor 46 connects the two braid portions 42a, 42b. The spacing of the forward end 48 of conductive sleeve 30 from the junction between conductor 36 and shunt 44 is essentially one quarter wave length after electrical compensation adjustments to the system. If desired, other appropriate spacings which provide essentially the same result may be used as equivalent spacings. Inductive shunt 44 may most practically be adjusted by trial and error until the desired impedance matching between cable 17 and the desired model of telephone 10 is achieved.

FIG. 4 shows a housing 50 which may be provided to protect and support the impedance matching means 40.

Referring to FIG. 6, a cable 17a, similar to cable 17, is attached to conductive sleeve 30a which is similar to sleeve 30, having a different design of impedance matching means as shown. Specifically, the impedance matching means shown may be broadly similar to the impedance matching member of Blaese U.S. Pat. No. 4,875,051, with a central conductor 36a of coaxial cable 17a being connected to the central conductor 52 of a short piece of coaxial cable in branched connection thereto. Other conductors 54 provide connection between the respective outer tubular conductors of coaxial cable 17a, while an end conductor 56 provides communication between the outer end of central conductor 52 and its corresponding outer, tubular conductor. The impedance of course varies with the length of the branch segment of coaxial cable.

Thus, by this invention, an antenna connector is provided for typically temporary communication between an antenna and a portable telephone or similar device. This is accomplished typically without using any antenna carried by the device, and making use of signal propagation by means of induction and/or capacitance, rather than a metal wire connection. Thus, electronic communication may take place between a portable telephone and a better antenna than the one normally provided, in a temporary manner under any desired circumstances.

The above has been offered for illustrative purposes only, and is not intended to limit the scope of the invention of this application, which is as defined in the claims below.

Which is claimed is:

1. An antenna coupling system for communication with antenna input/output circuitry of a portable hand held transmitter/receiver having a radiating antenna and an outer casing, which comprises:
    a length of conductive cable having a main conductor;
    coupling means attached to one end of said cable for removable physical connection over the radiating antenna of said transmitter/receiver and for electronic connection with said input/output circuitry for energy transfer free of direct electrical connection between said main conductor and the antenna input/output circuitry and using at least partially capacitance principles to effect said energy transfer, said cable defining an opposed end having means for conductive connection with an antenna, said coupling means being physically attached to a transmitter/receiver at a portion of said outer casing which is made of an electrically non-conductive material, said electronic connection communicating through said non-conductive casing portion, said means for electronic connection comprising a conductive sleeve forming part of said coupling means and to also serve as a capacitor plate, said conductive sleeve being connected with said cable and defining a frustoconical bore proportioned to grip an antenna housing of a transmitter/receiver for removable retention thereon.

2. An antenna coupling system for communication with antenna input/output circuitry of a portable hand held transmitter/receiver having a radiating antenna, which comprises:
    a length of conductive cable having a proximal end and a distal end, said cable comprising a main conductor and a ground conductor;
    a coupling device attached at said proximal end to said main conductor for removable physical connection over the radiating antenna of said transmitter/receiver and for providing proximity coupling of said main conductor to said transmitter/receiver in a manner to provide transfer of electrical energy free of direct electrical connection between said main conductor and the antenna input/output circuitry, said cable having means for conductive connection with an antenna at said distal end;
    said connector comprising a conductive sleeve to serve as a capacitive plate, said conductive sleeve being connected with said cable and defining a frusto-conical bore proportioned to grip an antenna housing of said transmitter/receiver for removable retention thereto.

3. The antenna coupling system of claim 2 in which said conductive sleeve defines an outer surface of polygonal cross section, said sleeve residing in an aperture of similar polygonal cross section defined in a connector housing carried by said cable.

4. An antenna coupling system for communication with antenna input/output circuitry of a portable hand held transmitter/receiver having a radiating antenna, which comprises:
    a length of conductive coaxial cable having an inner conductor and an outer tubular conductive mesh;
    coupling means attached to one end of said cable, for removable physical connection over the radiating antenna of said transmitter/receiver and for electronic connection with said input/output circuitry for transfer of electrical energy free of direct electrical connection between said main conductor and the antenna input/output circuitry using at least one of inductance and capacitance, said cable defining an opposed end having means for conductive connection with an antenna, and also having means for providing matched impedance between said cable and transmitter/receiver;
    said radiating antenna having a conductive portion and being a permanent antenna, said means for physical and electronic connection being removably physically attached to said transmitter/receiver at a position surrounding said conductive portion of said permanent antenna;
    said connector being physically attached to said transmitter/receiver at a portion that is made of an electrically non-conductive material, said electronic connection communicating through said non-conductive material.

5. The antenna coupling system of claim 4 in which inductive shunt means communicates with the inner conductor at essentially quarter wave spacing relative to said means for electronic connection, said shunt means also communicating with said outer, tubular conductive mesh, to provide impedance matching between said cable and a specified transmitter/receiver.

6. The antenna coupling system of claim 5 in which said means for electronic connection comprises a conductive sleeve forming part of said physical connection means to also serve as a capacitive plate, said conductive sleeve being connected with said inner conductor.

7. The antenna coupling system of claim 6 in which said conductive sleeve defines a frustoconical bore proportioned to grip an antenna housing of a transmitter/receiver for removable retention thereon.

8. The antenna coupling system of claim 7 in which said conductive sleeve defines an outer surface of polygonal cross section, said sleeve residing in an aperture of similar polygonal cross section defined in a connector housing carried by said cable.

9. An antenna system for communication with antenna input/output circuitry of a portable hand held transmitter/receiver having a radiating antenna, which comprises:
    a length of conductive cable having a proximal end and a distal end and comprising a main conductor and a ground conductor;

a connector attached at said proximal end to said main conductor;

means at said distal end for conductive connection with an antenna;

said connector being adapted for removable physical connection over the radiating antenna of said transmitter/receiver and for providing proximity coupling of said main conductor to said transmitter/receiver for transfer of electrical energy free of direct electrical connection between said main conductor and the antenna input/output circuitry;

said connector being in physical connection to said transmitter/receiver through an outer casing which is made of an electrically non-conductive material, said transfer of electrical energy communicating through said non-conductive material.

10. An antenna system for communication with antenna input/output circuitry of a portable hand held transmitter/receiver having a radiating antenna, which comprises:

a length of conductive cable having a proximal end and a distal end and comprising a main conductor and a ground conductor;

a connector attached at said proximal end to said main conductor;

means at said distal end for conductive connection with an antenna;

said connector being adapted for removable physical connection over the radiating antenna of said transmitter/receiver and for providing proximity coupling of said main conductor to said transmitter/receiver for transfer of electrical energy free of direct electrical connection between said main conductor and the antenna input/output circuitry;

said connector comprising a conductive sleeve to serve as a capacitive plate, said conductive sleeve being connected to said main conductor.

11. An antenna system for communication with antenna input/output circuitry of a portable hand held transmitter/receiver having a radiating antenna, which comprises:

a length of conductive cable having a proximal end and a distal end and comprising a main conductor and a ground conductor;

a connector attached at said proximal end to said main conductor;

an antenna attached at said distal end;

said connector being adapted for removable physical connection over the radiating antenna of said transmitter/receiver and for providing proximity coupling of said main conductor to said transmitter/receiver for transfer of electrical energy free of direct electrical connection between said main conductor and the antenna input/output circuitry;

said connector being in physical connection to said transmitter/receiver through an outer casing which is made of an electrically non-conductive material, said transfer of electrical energy communicating through said non-conductive material.

12. An antenna system for communication with antenna input/output circuitry of a portable hand held transmitter/receiver having a radiating antenna, which comprises:

a length of conductive cable having a proximal end and a distal end and comprising a main conductor and a ground conductor;

a connector attached at said proximal end to said main conductor;

an antenna attached at said distal end;

said connector being adapted for removable physical connection over the radiating antenna of said transmitter/receiver and for providing proximity coupling of said main conductor to said transmitter/receiver for transfer of electrical energy free of direct electrical connection between said main conductor and the antenna input/output circuitry;

said connector comprising a conductive sleeve to serve as a capacitive plate, said conductive sleeve being connected to said main conductor.

* * * * *